United States Patent
Yu et al.

(10) Patent No.: US 9,156,358 B2
(45) Date of Patent: Oct. 13, 2015

(54) REGENERATIVE BRAKING IN THE PRESENCE OF AN ANTILOCK BRAKING SYSTEM CONTROL EVENT

(71) Applicant: FORD GLOBAL TECHNOLOGIES, LLC, Dearborn, MI (US)

(72) Inventors: Hai Yu, Canton, MI (US); Kerem Bayar, Ann Arbor, MI (US); Dale Scott Crombez, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 106 days.

(21) Appl. No.: 14/053,692

(22) Filed: Oct. 15, 2013

(65) Prior Publication Data
US 2015/0105951 A1  Apr. 16, 2015

(51) Int. Cl.
*B60L 7/26* (2006.01)
*B60T 8/1761* (2006.01)
(Continued)

(52) U.S. Cl.
CPC ................ *B60L 7/26* (2013.01); *B60K 7/0007* (2013.01); *B60L 3/0046* (2013.01); *B60L 3/0061* (2013.01); *B60L 3/04* (2013.01); *B60L 3/108* (2013.01); *B60L 7/12* (2013.01); *B60L 7/18* (2013.01); *B60L 11/14* (2013.01); *B60L 11/1859* (2013.01); *B60L 11/1861* (2013.01); *B60L 15/2009* (2013.01); *B60T 8/176* (2013.01); *B60T 8/1761* (2013.01); *B60T 8/17616* (2013.01); *B60L 2220/44* (2013.01); *B60L 2240/12* (2013.01); *B60L 2240/421* (2013.01);
(Continued)

(58) Field of Classification Search
CPC ..... B60L 3/108; B60L 7/26; B60T 2270/602; B60T 2270/604; B60T 8/176; B60T 8/1761; B60T 8/17613; B60T 8/17616; B60K 7/007; B60K 7/0007
USPC ............................................................ 701/22
See application file for complete search history.

(56) References Cited

U.S. PATENT DOCUMENTS 5,472,265 A * 12/1995 Ohnuma .............................. 303/3
5,549,371 A *  8/1996 Konaga et al. .................. 303/152
(Continued)

FOREIGN PATENT DOCUMENTS

JP            09074605 A *  3/1997  ................ B60L 7/10
JP            10297462 A * 11/1998  ................ B60T 8/58
(Continued)

OTHER PUBLICATIONS

Shell, "Foul Weather Driving" (pamphlet #7 in a series), 2001, 8 pages.*
(Continued)

*Primary Examiner* — Behrang Badii
*Assistant Examiner* — David Testardi
(74) *Attorney, Agent, or Firm* — David B. Kelley; Brooks Kushman P.C.

(57) ABSTRACT

A hybrid electric vehicle includes at least one wheel, a friction brake, a motor, and at least one controller. The friction brake is coupled to the wheel and configured to provide friction brake torque, and the motor is coupled to the wheel and configured to provide regenerative brake torque. The controller is configured to command the motor to provide a regenerative brake torque to satisfy a low frequency torque component or a high frequency torque component of a required antilock wheel brake torque during an antilock braking event.

14 Claims, 7 Drawing Sheets

(51) Int. Cl.
  *B60K 7/00*      (2006.01)
  *B60T 8/176*     (2006.01)
  *B60L 3/00*      (2006.01)
  *B60L 3/04*      (2006.01)
  *B60L 3/10*      (2006.01)
  *B60L 7/12*      (2006.01)
  *B60L 7/18*      (2006.01)
  *B60L 11/14*     (2006.01)
  *B60L 11/18*     (2006.01)
  *B60L 15/20*     (2006.01)

(52) U.S. Cl.
  CPC ..... *B60L 2240/423* (2013.01); *B60L 2240/461* (2013.01); *B60L 2240/465* (2013.01); *B60L 2250/26* (2013.01); *B60T 2270/602* (2013.01); *B60T 2270/604* (2013.01)

(56) References Cited

U.S. PATENT DOCUMENTS

| | | | |
|---|---|---|---|
| 5,654,887 A * | 8/1997 | Asa et al. | 701/22 |
| 6,275,763 B1 | 8/2001 | Lotito et al. | |
| 6,344,732 B2 * | 2/2002 | Suzuki | 320/132 |
| 6,687,593 B1 * | 2/2004 | Crombez et al. | 701/71 |
| 6,709,075 B1 * | 3/2004 | Crombez et al. | 303/152 |
| 6,735,511 B2 * | 5/2004 | Nakamura et al. | 701/70 |
| 7,136,737 B2 * | 11/2006 | Ashizawa et al. | 701/70 |
| 7,654,620 B2 * | 2/2010 | Jeon et al. | 303/152 |
| 8,062,175 B2 | 11/2011 | Krueger et al. | |
| 2006/0220453 A1 | 10/2006 | Saito et al. | |
| 2008/0116743 A1 | 5/2008 | Jeon et al. | |
| 2010/0292882 A1 * | 11/2010 | Murata | 701/22 |
| 2011/0148184 A1 * | 6/2011 | Suzuki et al. | 303/3 |
| 2011/0276243 A1 * | 11/2011 | Minarcin et al. | 701/70 |
| 2013/0015791 A1 * | 1/2013 | Hatsumi et al. | 318/376 |
| 2013/0085650 A1 | 4/2013 | Nakamura et al. | |
| 2014/0012476 A1 * | 1/2014 | Azzi et al. | 701/70 |
| 2014/0207355 A1 * | 7/2014 | Akaho et al. | 701/71 |

FOREIGN PATENT DOCUMENTS

| | | | | |
|---|---|---|---|---|
| JP | 10322803 A | * | 12/1998 | B60L 7/24 |
| JP | 2005304100 A | * | 10/2005 | B60L 7/24 |
| JP | 2006025485 A | * | 1/2006 | |

OTHER PUBLICATIONS

The Auto Channel, "Shell Offers Tips to Prevent Accidents, Save Lives", Mar. 5, 2001, 2 pages, downloaded from: http://www.theautochannel.com/news/2001/03/05/015924.html.*

* cited by examiner

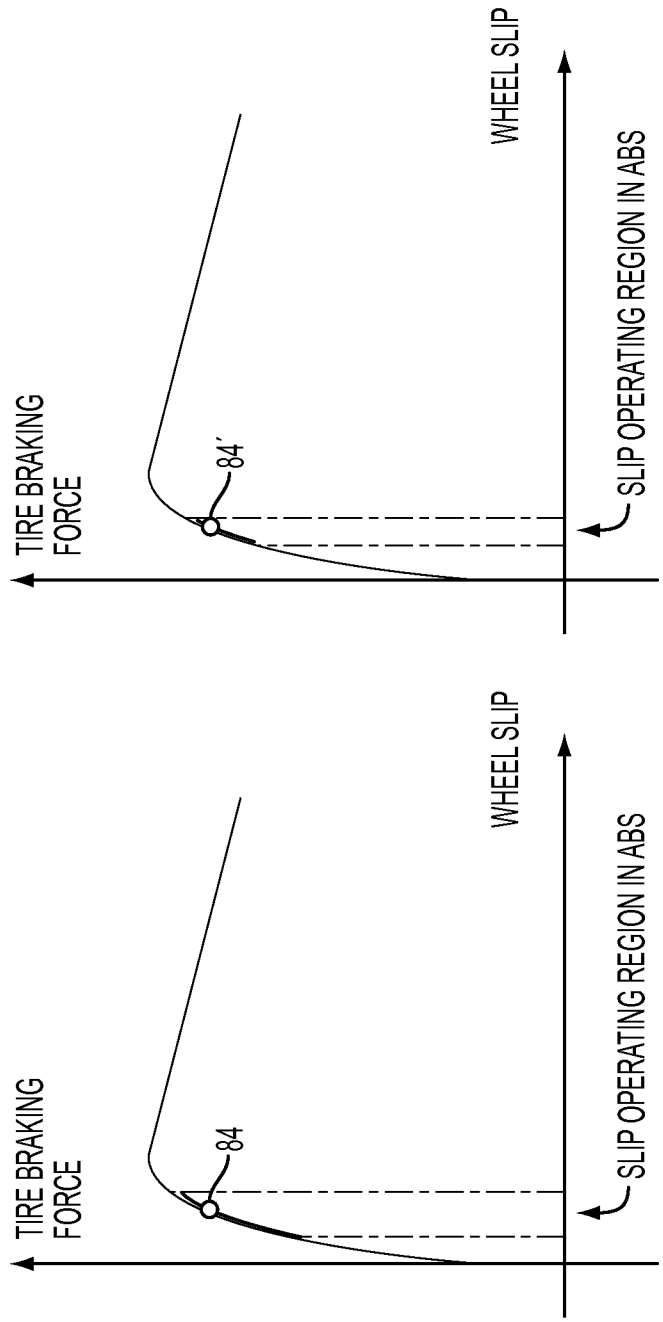

REGENERATIVE BRAKING IN THE PRESENCE OF AN ANTILOCK BRAKING SYSTEM CONTROL EVENT

TECHNICAL FIELD

This disclosure relates to hybrid vehicles with regenerative braking capabilities and generating regenerative braking power during an antilock braking system control event.

BACKGROUND

Hybrid electric vehicles include a vehicle traction motor in addition to an internal combustion engine. The electric motor is connected to at least two wheels by a transmission or gearbox. The motor provides output torque to the wheels through the gearbox for propelling the vehicle. The may motor also receive input torque from the wheels through the gearbox for generating electricity and braking the vehicle (regenerative braking). Electric vehicles often include a braking system that utilizes both friction braking and regenerative braking. Regenerative braking is used to recharge vehicle batteries, and recovers much of the energy that would otherwise be lost as heat during friction braking. Therefore regenerative braking improves the overall efficiency or fuel economy of the electric vehicle as compared to vehicles only configured for friction braking.

During regenerative braking, interactions between an antilock braking system (ABS) of the vehicle, the powertrain and the road surface can result in deflections in the powertrain (i.e., powertrain oscillations). Consequentially, during an ABS event regenerative braking is disabled to avoid destabilizing the vehicle.

SUMMARY

A vehicle includes at least one wheel, a friction brake, a motor, and at least one controller. The friction brake is coupled to the wheel and configured to provide friction brake torque, and the motor is coupled to the wheel and configured to provide regenerative brake torque. The controller is configured to filter a requested antilock wheel brake torque into different frequency components and command the motor to provide a regenerative brake torque to satisfy one of the frequency components during an antilock braking event.

The one of the frequency components that the controller commands the motor to provide may have a frequency less than other of the frequency components. The controller may be configured to scale the magnitude of the one of the frequency components in response to a wheel slip magnitude. The controller may be configured to reduce the commanded regenerative brake torque in response to at least one of a battery state of charge falling below a threshold, a battery charging or discharging limit being exceeded, and a motor speed or torque limit being exceeded. The controller may be further configured to command the friction brake to provide a friction brake torque to satisfy other frequency components.

A method of controlling a hybrid electric vehicle includes filtering a required antilock wheel brake torque into first and second frequency components. The first component has a higher frequency than the second component. The method additionally includes commanding one of a friction brake and a motor to provide a torque to satisfy the first component and the other to satisfy the second component, where both the friction brake and the motor are coupled to a wheel.

In one embodiment of the method, the friction brake is commanded to provide a friction brake torque to satisfy the first component and the motor is commanded to provide a regenerative brake torque to satisfy the second component. In such an embodiment, decomposing the required antilock wheel brake torque into first and second components may comprise filtering the required antilock wheel brake torque with a low pass filter and scaling the filtered antilock wheel brake torque according to a wheel slip magnitude to obtain the second component. Commanding the friction brake to satisfy the first component may include commanding the friction brake to provide a friction brake torque equal to the required antilock wheel brake torque less a percentage of the commanded regenerative brake torque. The method may include reducing the commanded regenerative brake torque in response to at least one of a battery state of charge falling below a threshold, a battery charging or discharging limit being exceeded, and a motor speed or torque limit being exceeded.

In another embodiment of the method, the friction brake is commanded to provide a friction brake torque to satisfy the second component and the motor is commanded to provide a regenerative braking torque to satisfy the first component. In such an embodiment, decomposing the required antilock wheel brake torque into the first and second components may comprise filtering the required antilock wheel brake torque with a low pass filter to obtain the second component, and commanding the motor to provide the regenerative brake torque may comprise commanding the motor to provide a torque equal to the required antilock wheel brake torque less the filtered antilock wheel brake torque. Commanding the friction brake torque to satisfy the second component may include commanding the friction brake to provide a friction brake torque equal to the required antilock wheel brake torque less a percentage of the commanded regenerative brake torque. The method may include reducing the commanded regenerative brake torque in response to at least one of a battery state of charge falling below a threshold, a battery charging or discharging limit being exceeded, and a motor speed or torque limit being exceeded. The method may additionally include filtering the required antilock wheel brake torque with a band stop filter to remove frequency components that excite a vehicle powertrain.

A hybrid electric vehicle includes a wheel, a friction brake, a motor, and at least one controller. The friction brake is coupled to the wheel and configured to provide friction brake torque, and the motor is coupled to the wheel and configured to provide regenerative brake torque. The controller is configured to filter a required antilock wheel brake torque with a low pass filter and command the motor to provide a regenerative braking torque according to the difference of the required antilock wheel brake torque and the filtered antilock brake torque.

The controller may be configured to command the friction brake to provide a friction brake torque equal to the antilock wheel brake torque less a percentage of the commanded regenerative brake torque. The controller may be configured to reduce the commanded regenerative brake torque in response to at least one of a battery state of charge falling below a threshold, a battery charging or discharging limit being exceeded, and a motor speed or torque limit being exceeded. The controller may be further configured to filtering the required antilock wheel brake torque with a band stop filter to remove frequency components that excite a vehicle powertrain.

Embodiments according to the present disclosure provide a number of advantages. For example, antilock brake systems according to the present disclosure provide regenerative braking during antilock braking events, recovering kinematic energy as stored electrical energy and reducing wear on friction brakes. Embodiments of the present disclosure also provide reduced stopping distance relative to prior art methods.

The above and other advantages and features of the present disclosure will be readily apparent from the following detailed description of the preferred embodiments when taken in conjunction with the accompanying drawings.

BRIEF DESCRIPTION OF THE DRAWINGS

FIGS. 7a and 7b illustrate wheel slip during an antilock braking event according to various embodiments of the present disclosure.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Hybrid electric or electric vehicles include at least one traction motor for providing torque to a vehicle traction wheel. The traction motor may be arranged in various configurations, such as hub motors which provide torque at the traction wheel hub, and axle motors, which provide torque to vehicle axles, which then transmit the torque to the traction wheels. Such motors may be configured to act as generators and provide regenerative braking torque during braking events. During such a braking event, required wheel braking torque is allocated between friction brakes and the motor, which acts as a generator. The apportionment of wheel braking torque between friction braking torque and regenerative braking torque is calculated in real time by a controller. The controller is configured to balance the respective torques through the braking process to achieve as much regeneration as possible. A portion of the vehicle's kinematic energy may thus be recovered as stored electrical energy.

Figure 1:
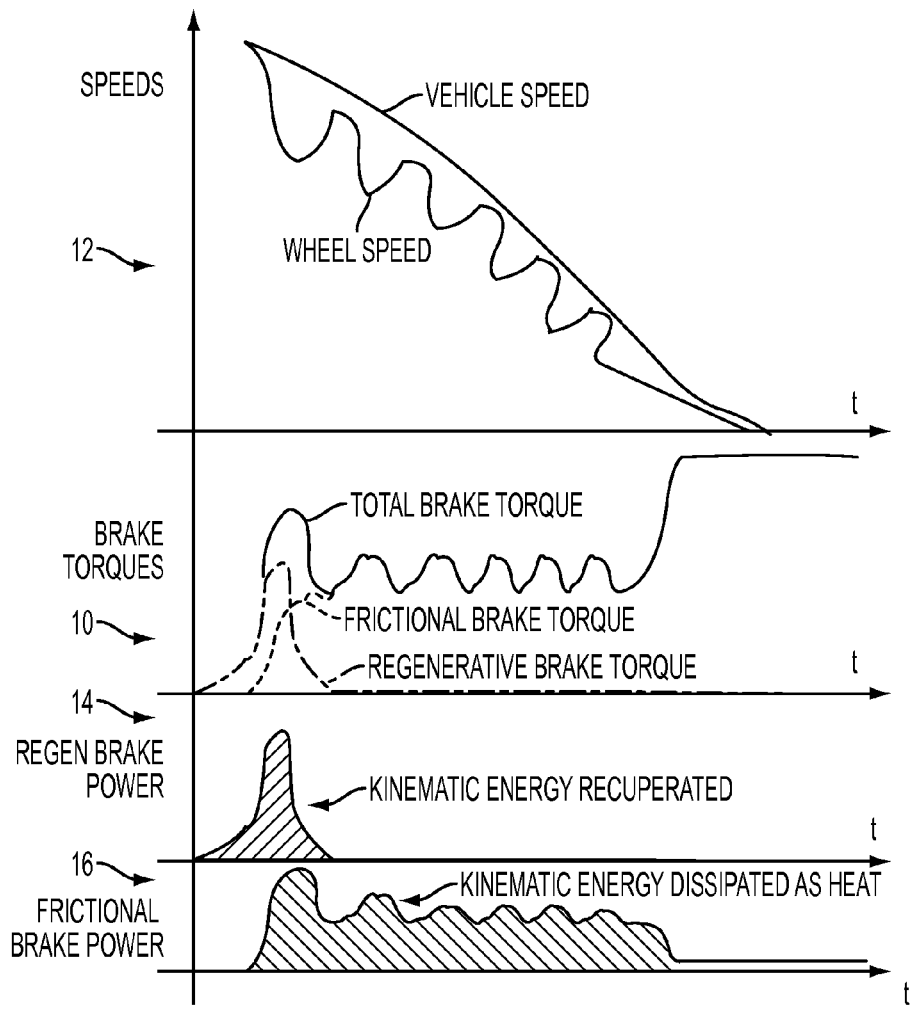
FIG. 1 is a plot illustrating prior art friction brake and regenerative brake behavior during an antilock braking event.

Referring to FIG. 1, a plot illustrating prior art friction brake and regenerative brake behavior during an antilock braking event is shown. As indicated at 10, during antilock braking events, the magnitude of total brake torque applied to the traction wheels is varied in an oscillating manner. As illustrated at 12, wheel speed is more responsive to braking torque than vehicle speed. As braking torque increases, so does wheel slip. Total braking torque is varied during antilock braking to maintain desired braking force and wheel slip values.

Antilock braking controllers are calibrated based on application of only frictional brake torque. The application of regenerative braking torque can thus destabilize the vehicle by adding extra torque to the ABS pulsation. Consequently, during antilock braking events, the regenerative braking torque is reduced to approximately 0 in most current implementations of regenerative braking, as illustrated at 10. Relatively little kinematic energy is recovered by regenerative braking, as illustrated at 14. The majority of kinematic energy is instead dissipated as heat in the friction brake, as illustrated at 16.

Figure 2:
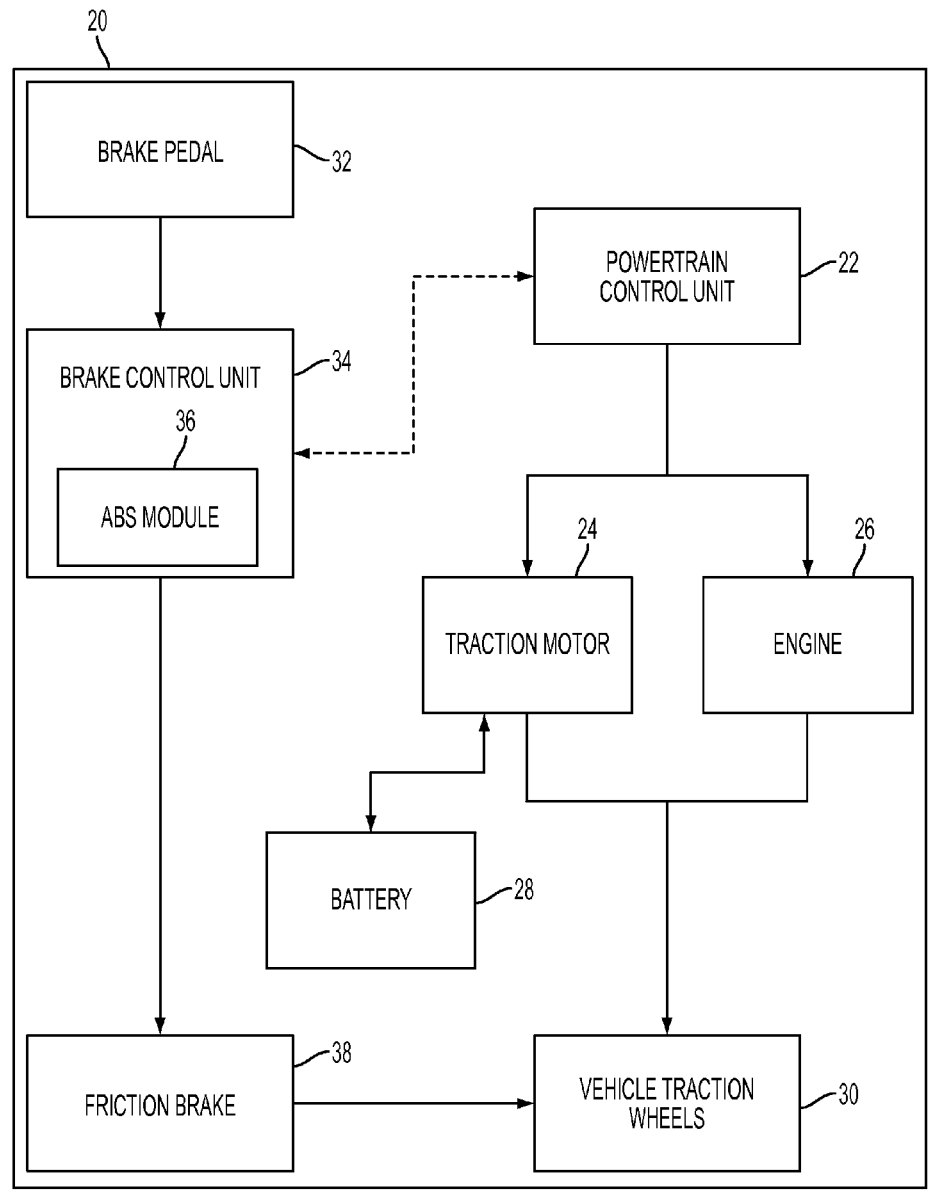
FIG. 2 illustrates a vehicle having an antilock braking system according to the present disclosure.

With reference to FIG. 2, a schematic representation of a hybrid electric vehicle 20 having an antilock brake system is shown. The vehicle 20 includes a Powertrain Control Unit 22, a traction motor 24, an engine 26, a battery 28, and vehicle fraction wheels 30. The traction motor 24 and engine 26 are both in communication with or under control of the powertrain control unit 22 and configured to provide drive torque to traction wheels 30. Traction motor 24 is electrically connected to battery 28. Battery 28 may provide electric power to fraction motor 24 in an electric drive mode. Traction motor 24 may also provide regenerative braking torque to traction wheels 30 to generate electricity and charge battery 28. The vehicle 20 further includes a brake pedal 32, a brake control unit 34 including an ABS module 36, and a friction brake 38. Brake pedal 32 communicates driver brake requests to brake control unit 34. Brake control unit controls friction brake 38, which is configured to supply friction braking torque to traction wheels 30. Brake control unit 34 is also in communication with powertrain control unit 22. Brake control unit 34 may communicate a regenerative braking request to powertrain control unit 22. In response to such a request, powertrain control unit 22 will command traction motor 24 to provide regenerative braking torque to traction wheels 30. In short, brake control unit 34 coordinates friction brake torque and regenerative brake torque to provide a desired total braking torque to satisfy the driver brake request. Other configurations are of course possible.

Figure 3:
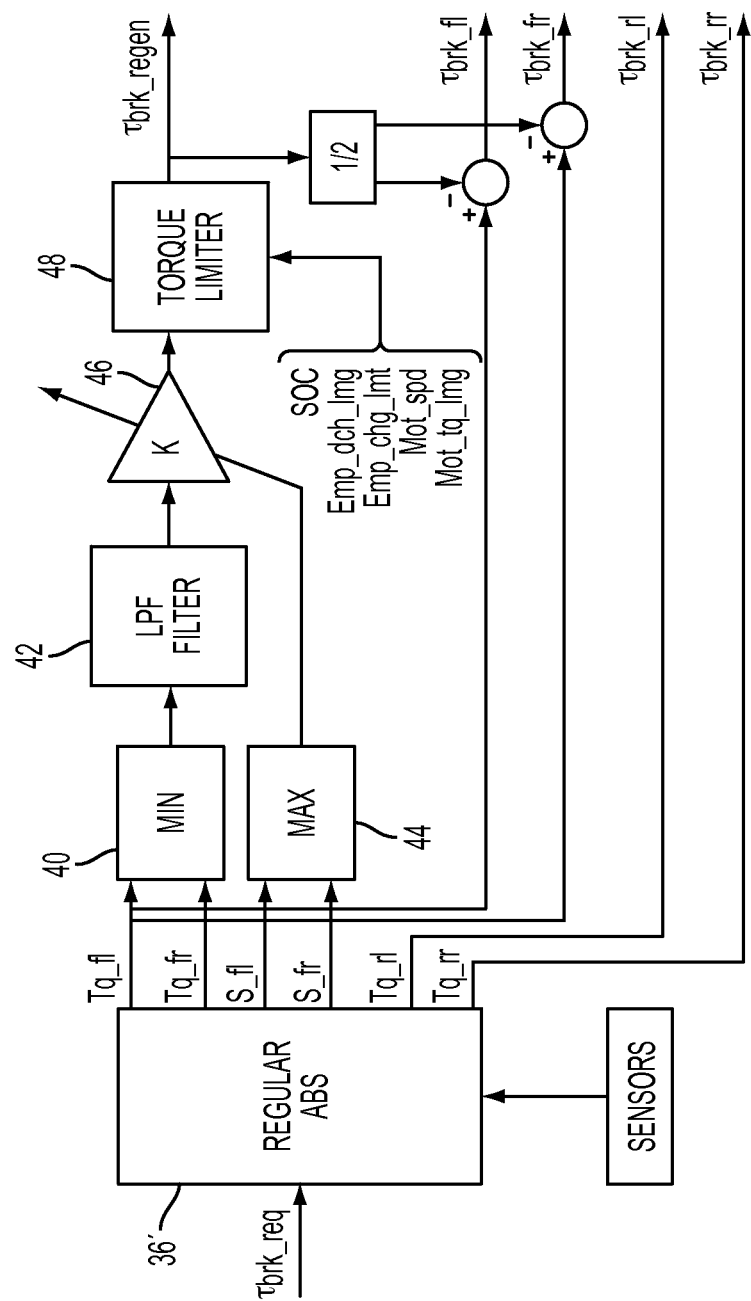
FIG. 3 is a plot illustrating an embodiment of friction brake and regenerative brake operation during an antilock braking event according to the present disclosure.

Referring to FIG. 3, a control system for controlling friction brake torque and regenerative brake torque according to the present disclosure is illustrated. An ABS module 36' receives a signal indicative of a requested antilock braking torque. This request may come from, for example, a braking control unit. ABS system 36' calculates a braking torque for a front left vehicle wheel Tq_fl, braking torque for a front right vehicle wheel Tq_fr, braking torque for a rear left vehicle wheel Tq_rl, braking torque for a rear right vehicle wheel Tq_rr, front left wheel slip S_fl, and front right wheel slip S_fr. The minimum of Tq_fl and Tq_fr is selected at operation 40 and used as a control torque. The control torque is filtered through low pass filter 42. The filtered control torque may be understood to be a low frequency component of the required antilock braking torque. In a parallel operation, the maximum of S_fl and S_fr is selected at operation 44 and used to generate a gain parameter K. Gain K varies from 0 to 1 inversely relative to the maximum wheel slip selected at operation 44. At high wheel slips K will be reduced to a value at or near 0, while at low wheel slips K will be increased to a value at or near 1. The filtered control torque is scaled by gain K at operation 46. Consequently, at high wheel slip values the control torque will be reduced to avoid interference with friction brake ABS performance. Operation then passes to torque limiter 48. Torque limiter 48 may reduce the scaled control torque if commanding the scaled control torque would cause one of a variety of monitored parameters to exceed an associated threshold. The parameters include, but are not limited to, battery state of charge SOC, battery discharge limit Emp_dch_lmg, battery charging limit Emp_chg_lmt, Motor speed Mot_spd, and motor torque limit Mot_tq_lmg. In this fashion, the operation prevents battery overcharging, motor overspeeds, and other undesirable effects. Torque limiter 48 outputs a motor regenerative braking torque $\tau_{brk\_regen}$. A traction motor is commanded to provide regenerative torque equal to $\tau_{brk\_regen}$ to vehicle traction wheels. A front left friction brake is commanded to provide a friction braking torque $\tau_{brk\_fl}$ equal to Tq_fl less one half of $\tau_{brk\_regen}$, and a front right friction brake is commanded to provide a friction braking torque $\tau_{brk\_fr}$ equal to Tq_fr less one half of $\tau_{brk\_regen}$. Because the low frequency torque component has been subtracted from respective braking torques, the friction brakes may thus be understood to apply a high frequency torque component of the required braking torque. A rear left friction brake is commanded to apply a friction braking torque $\tau_{brk\_rl}$ equal to Tq_rl, and a rear right friction brake is commanded to apply a friction braking torque $\tau_{brk\_rr}$ equal to Tq_rr.

Figure 4:
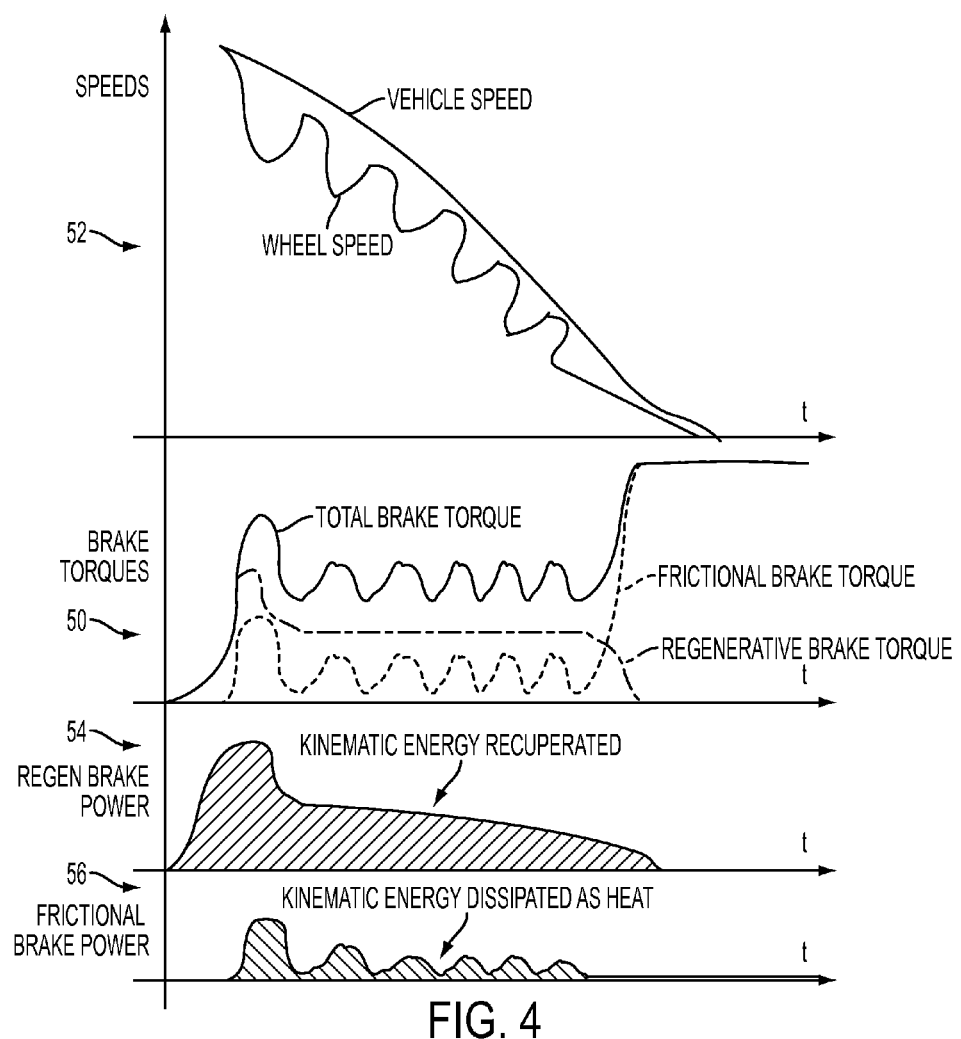
FIG. 4 illustrates an embodiment of a control system for controlling friction brake torque and regenerative brake torque according to the present disclosure.

Referring to FIG. 4, a plot illustrating friction brake and regenerative brake operation according to an embodiment of the present disclosure is shown. As illustrated at 50 and 52, the total brake torque applied is consistent in magnitude and frequency with prior art methods and thus the vehicle and wheels decelerate in similar fashion. In contrast to prior art methods, regenerative brake torque is applied by the traction motor during the braking event. The traction motor provides a regenerative brake torque to satisfy a low frequency component of the total required brake torque, and the friction brake provides a frictional brake torque to satisfy a high frequency component. As illustrated at 54 and 56, an increased amount of kinematic energy is recovered by regenerative braking relative to prior art methods, and a reduced amount of kinematic energy is dissipated as heat.

Figure 5:
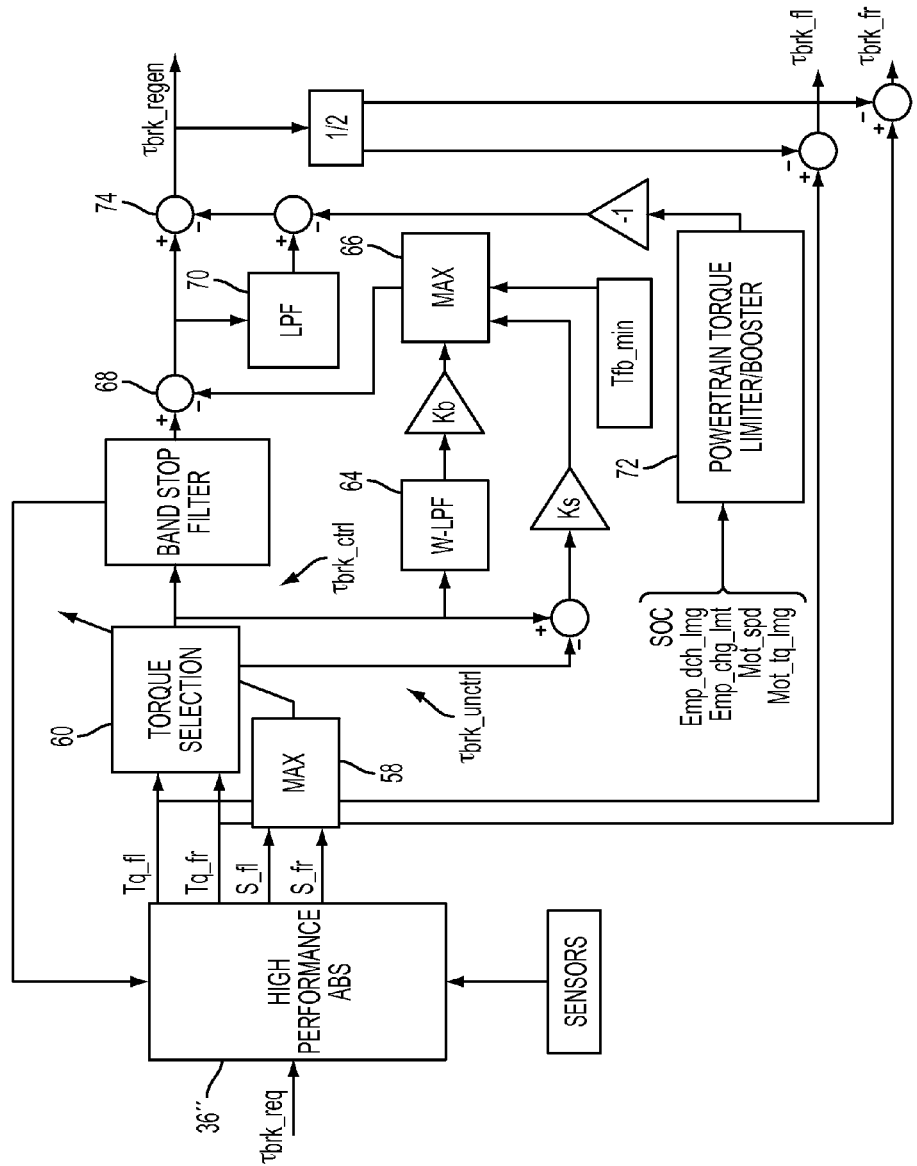
FIG. 5 is a plot illustrating another embodiment of friction brake and regenerative brake operation during an antilock braking event according to the present disclosure.

Referring to FIG. 5, another embodiment of a control system for controlling friction brake torque and regenerative brake torque according to the present disclosure is illustrated. An ABS module 36" receives a signal indicative of a requested antilock braking torque. ABS module 36" is a high performance ABS module adapted to command torque oscillations at an increased frequency relative to traditional ABS modules. The request may come from, for example, a braking control unit. ABS system 36" calculates a braking torque for a front left vehicle wheel Tq_fl, braking torque for a front right vehicle wheel Tq_fr, front left wheel slip S_fl, and front right wheel slip S_fr. The maximum of S_fl and S_fr is determined at operation 58 and used as a selector for the associated braking torque (left or right) at operation 60. The selected torque is used as the controlled torque $\tau_{brk\_ctrl}$ and the other torque is used as the uncontrolled torque $\tau_{brk\_unctrl}$. $\tau_{brk\_ctrl}$ is filtered through a band stop filter at operation 62. The band stop filter is configured to cut off harmonic frequency components that may excite the powertrain. Operation 62 additionally provides a feedback signal to ABS module 36" indicative of such frequency components. If such frequency components exist, ABS module 36" is configured to adjust the frequency of the braking torque signals Tq_fl and Tq_fr. $\tau_{brk\_ctrl}$ is additionally filtered through a wide band low-pass filter W-LPF at operation 64. The filtered control torque is then used to generate a parameter $K_b$. $K_b$ varies from 0 to 1, and represents a filtered portion of the control torque that may be assigned to the friction brake, as will be discussed below. A difference between $\tau_{brk\_ctrl}$ and $\tau_{brk\_unctrl}$ is also calculated and used to generate a parameter $K_s$. $K_s$ is a torque arbitration parameter that reserves a portion of friction brake torque due to torque differences between the left and right wheels, as will be discussed below. Tfb_min is a constant representing a minimum friction brake torque reserved during the control process. Tfb_min may be zero, but preferably is a small value to avoid hydraulic brake initialization delay. The maximum of Kb, Ks, and Tfb_min is selected at operation 66 and subtracted from the filtered control torque at operation 68. Consequently a torque portion is reserved for the friction brakes to satisfy the three requirements discussed above. The resultant torque is filtered through low pass filter 70. The filtered control torque may be understood to be a low frequency component of the required antilock braking torque. A powertrain torque limiter/booster may generate a torque limiting or boosting signal in response to a measured value exceeding a threshold associated with one of a variety of monitored parameters. The parameters include, but are not limited to, battery state of charge, battery discharge limit Emp_dch_lmg, battery charging limit Emp_chg_lmt, Motor speed Mot_spd, and motor torque limit Mot_tq_lmg. In this fashion, powertrain torque limiter/booster 72 generates a signal to prevent battery overcharging, motor overspeeds, and other undesirable effects. The signal from powertrain torque limiter/booster 72 is added to the filtered torque output from LPF 70. Operation then proceeds to operation 74, where his sum is subtracted from the resultant torque of operation 68 to obtain a regenerative braking torque $\tau_{brk\_regen}$. Because the torque filtered by LPF 70 is subtracted, $\tau_{brk\_regen}$ may be understood to contain the high frequency components of the controlled braking torque. A traction motor is commanded to provide regenerative torque equal to $\tau_{brk\_regen}$ to vehicle traction wheels. A front left friction brake is commanded to provide a friction braking torque $\tau_{brk\_fl}$ equal to Tq_fl less one half of $\tau_{brk\_regen}$, and a front right friction brake is commanded to provide a friction braking torque $\tau_{brk\_fr}$ equal to Tq_fr less one half of $\tau_{brk\_regen}$. Because the low frequency torque component has been subtracted from respective braking torques, the friction brakes may thus be understood to apply a high frequency torque component of the required braking torque. A rear left friction brake is commanded to apply a friction braking torque $\tau_{brk\_rl}$ equal to Tq_rl, and a rear right friction brake is commanded to apply a friction braking torque $\tau_{brk\_rr}$ equal to Tq_rr.

Figure 6:
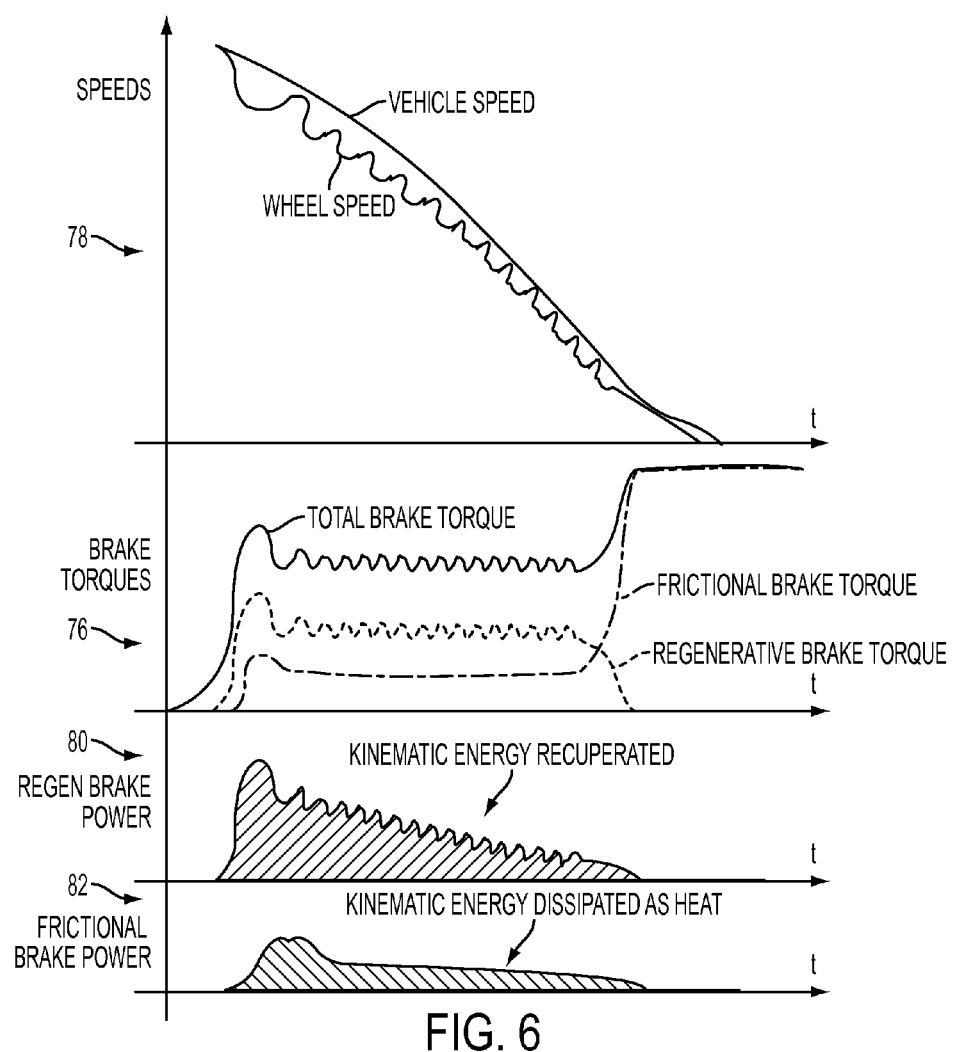
FIG. 6 illustrates another embodiment of a control system for controlling friction brake torque and regenerative brake torque according to the present disclosure.

Referring to FIG. 6, a plot illustrating friction brake and regenerative brake operation according to an embodiment of the present disclosure is shown. As illustrated at 76, the total brake torque applied is consistent in magnitude with prior art methods. However, the frequency of torque oscillations is increased relative to prior art methods, due to the higher bandwidth capability of the electric motor relative to friction brake controls. As will be discussed below, this permits the wheel slip to be controlled within a narrower slip range relative to an optimal slip. As illustrated at 78, the wheel speed oscillates thus at a higher frequency and lower magnitude relative to prior art methods. In contrast to prior art methods, regenerative brake torque is applied by the traction motor during the braking event. The traction motor provides a regenerative brake torque to satisfy a high frequency component of the total required brake torque, and the friction brake provides a frictional brake torque to satisfy a low frequency component. Notably, if the magnitude of the regenerative brake torque is decreased, as may occur if torque limiter/booster 72 limits the motor torque, the motor may still satisfy the high frequency component of the required brake torque even at low magnitudes. As illustrated at 80 and 82, an increased amount of kinematic energy is recovered by regenerative braking relative to prior art methods, and a reduced amount of kinematic energy is dissipated as heat.

Referring to FIGS. 7a and 7b, plots illustrating wheel slip and tire braking force during an antilock braking event are shown. FIG. 7a illustrates wheel slip in antilock brake systems using friction brakes to provide high frequency components of the antilock braking torque. Point 84 indicates a wheel slip value to optimize the stopping distance of the vehicle. The wheel slip is allowed to vary within a range about optimal wheel slip value 84 according to the frequency of variation of friction brake torque. The slip range for such a system is comparable with the range for prior art systems. FIG. 7b illustrates wheel slip in antilock brake systems using a traction motor to provide high frequency components of the antilock braking torque. Point 84' indicates the optimal wheel slip value. The wheel slip is controlled within a narrower range about point 84' relative to systems illustrated in 7a due to the increased bandwidth of the traction motor. The regenerative braking torque may be varied at a higher rate than friction braking torque, and thus wheel slip may be controlled to be closer to optimal wheel slip value 84', resulting in a shorter stopping distance of the vehicle.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

As can be seen from the various embodiments, the present disclosure describes an antilock brake system capable of regenerative braking during antilock braking events, recovering kinematic energy as stored electrical energy and reducing wear on friction brakes. Embodiments of the present disclosure also provide reduced stopping distance relative to prior art methods.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a wheel;
   a friction brake coupled to the wheel and configured to provide friction brake torque;
   a motor coupled to the wheel and configured to provide regenerative brake torque; and
   at least one controller configured to filter a requested antilock wheel brake torque into different frequency components, scale a magnitude of one of the frequency components based on a magnitude of wheel slip, and command the motor to provide a regenerative brake torque to satisfy the one of the frequency components during an antilock braking event.

2. The vehicle of claim 1, wherein the one of the frequency components has a frequency less than other of the frequency components.

3. The vehicle of claim 1, wherein the at least one controller is further configured to reduce the commanded regenerative brake torque in response to at least one of a battery state of charge exceeding a threshold, a battery charging or discharging limit being exceeded, and a motor speed or torque limit being exceeded.

4. The vehicle of claim 1, wherein the at least one controller is further configured to command the friction brake to provide a friction brake torque to satisfy the other of the frequency components.

5. The vehicle of claim 4, wherein the friction brake torque to satisfy the other of the frequency components is based on a first torque to satisfy the requested antilock wheel brake torque less a percentage of the regenerative brake torque.

6. The vehicle of claim 1, wherein the controller is configured to filter the requested antilock wheel brake torque with a low pass filter.

7. A method of controlling a hybrid electric vehicle comprising:
   filtering a required antilock wheel brake torque into first and second components, the first component having a higher frequency than the second component;
   commanding one of a friction brake and a motor, each coupled to a wheel, to provide a torque to satisfy the first component; and
   commanding the other of the friction brake and the motor to provide a torque to satisfy the second component, wherein the friction brake is commanded to provide a friction brake torque to satisfy the second component and the motor is commanded to provide a regenerative brake torque to satisfy the first component, and wherein commanding the friction brake to provide a friction brake torque to satisfy the second component comprises commanding the friction brake to provide a friction brake torque equal to a first torque to satisfy the required antilock wheel brake torque less a percentage of the commanded regenerative brake torque.

8. The method of claim 7, wherein filtering the required antilock wheel brake torque into the first component and the second component comprises filtering the required antilock wheel brake torque with a low pass filter to obtain the second component, and wherein commanding the motor to provide the regenerative brake torque comprises commanding the motor to provide a torque equal to the required antilock wheel brake torque less the filtered antilock wheel brake torque.

9. The method of claim 7, further comprising reducing the commanded regenerative brake torque in response to at least one of a battery state of charge exceeding a threshold, a battery charging or discharging limit being exceeded, and a motor speed or torque limit being exceeded.

10. The method of claim 7, further comprising filtering the required antilock wheel brake torque with a band stop filter to remove frequency components that excite a vehicle powertrain.

11. A vehicle comprising:
a wheel;
a friction brake configured to provide friction brake torque to the wheel;
a motor configured to provide regenerative brake torque to the wheel; and
at least one controller configured to filter a required antilock wheel brake torque with a low pass filter and command the motor to provide a regenerative brake torque according to the difference between the required antilock wheel brake torque and the filtered antilock wheel brake torque.

12. The vehicle of claim 11, wherein the controller is further configured to command the friction brake to provide a friction brake torque equal to a first torque to satisfy the required antilock wheel brake torque less a percentage of the commanded regenerative brake torque.

13. The vehicle of claim 11, wherein the controller is further configured to reduce the commanded regenerative brake torque in response to at least one of a battery state of charge exceeding a threshold, a battery charging or discharging limit being exceeded, and a motor speed or torque limit being exceeded.

14. The vehicle of claim 11, wherein the controller is further configured to filter the required antilock wheel brake torque with a band stop filter to remove frequency components that excite a powertrain of the vehicle.

* * * * *